US009783674B2

(12) United States Patent
Takimoto et al.

(10) Patent No.: US 9,783,674 B2
(45) Date of Patent: Oct. 10, 2017

(54) POLYCARBONATE RESIN COMPOSITION

(71) Applicant: IDEMITSU KOSAN CO., LTD., Chiyoda-ku (JP)

(72) Inventors: Masami Takimoto, Sodegaura (JP); Mitsugu Nakae, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/035,135

(22) PCT Filed: Nov. 10, 2014

(86) PCT No.: PCT/JP2014/079762
§ 371 (c)(1),
(2) Date: May 6, 2016

(87) PCT Pub. No.: WO2015/068843
PCT Pub. Date: May 14, 2015

(65) Prior Publication Data
US 2016/0280909 A1    Sep. 29, 2016

(30) Foreign Application Priority Data

Nov. 11, 2013    (JP) .................. 2013-233429

(51) Int. Cl.
*C08K 5/00* (2006.01)
*C08L 69/00* (2006.01)
*C08L 71/02* (2006.01)
*F21V 8/00* (2006.01)

(52) U.S. Cl.
CPC .............. *C08L 69/00* (2013.01); *C08L 71/02* (2013.01); *G02B 6/0065* (2013.01)

(58) Field of Classification Search
CPC .............................. C08L 69/00; G02B 6/0065
USPC ....................................................... 524/108
See application file for complete search history.

(56) References Cited

U.S. PATENT DOCUMENTS

| 2009/0162628 A1 | 6/2009 | Kurokawa et al. |
| 2011/0071241 A1* | 3/2011 | Rogunova .............. C08K 5/109 524/127 |
| 2012/0309874 A1* | 12/2012 | Takimoto .............. C08G 65/20 524/120 |
| 2014/0042646 A1 | 2/2014 | Kurokawa et al. |
| 2014/0364546 A1 | 12/2014 | Okamoto et al. |

FOREIGN PATENT DOCUMENTS

| EP | 1 764 393 A1 | 3/2007 |
| EP | 2 522 697 A1 | 11/2012 |
| JP | 2006-169451 A | 6/2006 |
| JP | 2007-204737 A | 8/2007 |
| JP | 4069364 B2 | 1/2008 |
| JP | 2008-163070 A | 7/2008 |
| JP | 2013-139097 A | 7/2013 |
| JP | 2013-231899 A | 11/2013 |
| WO | 2011/083635 A1 | 7/2011 |
| WO | 2013/088796 A1 | 6/2013 |
| WO | 2015/011994 A1 | 1/2015 |
| WO | 2016/060220 A1 | 4/2016 |

OTHER PUBLICATIONS

International Search Report Issued Feb. 3, 2015 in PCT/JP14/79762 Filed Nov. 10, 2014.
Search Report dated Jun. 12, 2017 issued in corresponding European patent application No. 14859644.8.

* cited by examiner

*Primary Examiner* — Hui Chin
(74) *Attorney, Agent, or Firm* — Oblon, McClelland, Maier & Neustadt, L.L.P.

(57) ABSTRACT

Provided is a polycarbonate resin composition, including, with respect to 100 parts by mass of an aromatic polycarbonate resin (A), 0.005 part by mass to 1 part by mass of a phosphorus-based compound (B) having an aryl group, and 0.005 part by mass to 5 parts by mass of a polyether compound (C) having a polyoxyalkylene structure, in which the phosphorus-based compound (B) includes such a compound that an amount of a compound having a phenol structure produced by decomposition of the compound 1,500 hours after standing thereof under conditions of 40° C. and a humidity of 90% is 5 mass % or less with respect to the phosphorus-based compound (B).

16 Claims, No Drawings

POLYCARBONATE RESIN COMPOSITION

TECHNICAL FIELD

The present invention relates to a polycarbonate resin composition.

BACKGROUND ART

An aromatic polycarbonate is excellent in, for example, transparency, mechanical properties, thermal properties, electrical properties, and weatherability, and has been used in an optical molded article, such as a light-guiding plate, a lens, or an optical fiber, through the utilization of its characteristics. However, the light transmittance of the polycarbonate serving as one of the indicators representing its transparency is lower than that of, for example, a polymethyl methacrylate (PMMA). Therefore, a surface light source body including a light-guiding plate made of the aromatic polycarbonate and a light source has a problem in that its luminance is low. Accordingly, the development of a method of improving a luminance and a light transmittance in the light-guiding plate made of the aromatic polycarbonate has been progressing.

In PTL 1, in order to provide a polycarbonate resin composition for a light-guiding plate that is free from becoming opaque and being reduced in transmittance, and that has a satisfactory transmittance and a satisfactory hue, there is a disclosure of an aromatic polycarbonate resin composition for a light-guiding plate obtained by incorporating, into an aromatic polycarbonate resin, a polyoxyalkylene glycol containing a polyethylene glycol or a polypropylene glycol as a main component, or a fatty acid ester thereof.

However, in the method of PTL 1, the heat resistance of the polyoxyalkylene glycol is low, and hence when the composition is molded at a temperature of more than 320° C. or its molding cycle is long, its yellowing becomes serious to largely reduce its luminance and light transmittance, and the reductions may adversely affect the optical performance of a light-guiding product. Further, when the molding is performed at a temperature of more than 340° C., a silver mark occurs on the surface of a molded article owing to the decomposition gas of the polyoxyalkylene glycol to preclude the article from functioning as the light-guiding product. Accordingly, a temperature increase for an improvement in flowability of the composition is limited, and hence the composition cannot be molded into a thin-walled and large-area light-guiding plate. Therefore, the method is applicable only to some molding materials for small light-guiding plates to be molded at a low temperature around 280° C., and hence its practical range is narrow and insufficient.

In PTL 2, in order to provide an aromatic polycarbonate resin composition capable of resisting molding at high temperature through the alleviation of the insufficient heat resistance serving as a drawback of the method of PTL 1, there is a disclosure of an aromatic polycarbonate resin composition obtained by blending an aromatic polycarbonate resin with a polyoxytetramethylene-polyoxyethylene glycol. According to the method of PTL 2, the composition can be molded in the temperature region of from 280° C. to 340° C. without yellowing.

Meanwhile, in PTL 3, in order to provide a resin composition excellent in heat stability in high-temperature molding and capable of providing a molded article that is excellent in light transmittance and luminance, and that does not cause discoloration or an internal crack after a moist heat resistance test, there is a disclosure of an aromatic polycarbonate resin composition obtained by incorporating a specific diphosphite compound and a specific alicyclic epoxy compound into an aromatic polycarbonate resin. According to the method of PTL 3, the composition can be molded at a temperature of more than 340° C. without yellowing.

CITATION LIST

Patent Literature

PTL 1: JP 4069364 B2
PTL 2: WO 2011/083635 A1
PTL 3: WO 2013/088796 A1

SUMMARY OF INVENTION

Technical Problem

In recent years, additional thinning of a light-guiding plate has been progressing and hence molding may be performed at a temperature of more than 340° C., in particular, a temperature of more than 360° C. From the foregoing viewpoint, the method of PTL 2 is insufficient and hence an additional improvement thereof has been required.

On the other hand, some small light-guiding plates that do not need to be thinned are molded at a low temperature around 280° C. Accordingly, an aromatic polycarbonate resin composition that can be molded in an additionally wide temperature region without yellowing has been required. However, in the method of PTL 3, sufficient performance cannot be expressed in the molding temperature region of less than 300° C., though excellent heat stability in high-temperature molding is obtained.

Therefore, the problem to be solved by the present invention is to provide a polycarbonate resin composition that is not reduced in optical characteristics by its deterioration at the time of its molding even when molded in a wide temperature region.

Solution to Problem

As a result of their extensive investigations, the inventors of the present invention have found that the problem can be solved by blending an aromatic polycarbonate resin with specific amounts of a compound having a polyoxyalkylene structure and a specific phosphorus-based compound. The present invention has been completed on the basis of such findings.

That is, according to embodiments of the present invention, there are provided a polycarbonate resin composition and an optical molded article using the composition to be described below.

<1> A polycarbonate resin composition, comprising, with respect to 100 parts by mass of an aromatic polycarbonate resin (A), 0.005 part by mass to 1 part by mass of a phosphorus-based compound (B) having an aryl group, and 0.005 part by mass to 5 parts by mass of a polyether compound (C) having a polyoxyalkylene structure, wherein the phosphorus-based compound (B) comprises such a compound that an amount of a compound having a phenol structure produced by decomposition of the compound 1,500 hours after standing thereof under conditions of 40° C. and a humidity of 90% is 5 mass % or less with respect to the phosphorus-based compound (B).

<2> The polycarbonate resin composition according to Item <1>, wherein the aromatic polycarbonate resin (A) comprises a polycarbonate comprising, in a main chain thereof, a repeating unit represented by the following formula (I):

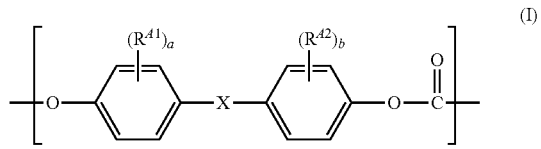

wherein $R^{A1}$ and $R^{A2}$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

<3> The polycarbonate resin composition according to Item <1> or <2>, wherein the phosphorus-based compound (B) comprises a phosphorus-based compound having a phosphite structure.

<4> The polycarbonate resin composition according to any one of Items <1> to <3>, wherein the phosphorus-based compound (B) comprises a pentaerythritol diphosphite compound represented by the following formula (II):

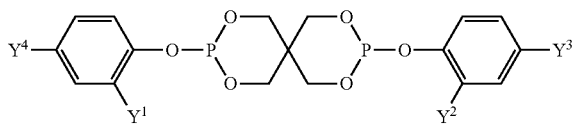

wherein $Y^1$ to $Y^4$ each independently represent a hydrocarbon group having 6 or more carbon atoms.

<5> The polycarbonate resin composition according to Item <4>, wherein the $Y^1$ to $Y^4$ each independently represent a substituted or unsubstituted cumyl group, a substituted or unsubstituted phenyl group, a substituted or unsubstituted naphthyl group, or a substituted or unsubstituted biphenyl group.

<6> The polycarbonate resin composition according to any one of Items <1> to <5>, wherein the phosphorus-based compound (B) comprises a pentaerythritol diphosphite compound represented by the following formula (II-1):

wherein $R^{B1}$ to $R^{B8}$ each independently represent an alkyl group or an alkenyl group, $R^{B1}$ and $R^{B2}$, $R^{B3}$ and $R^{B4}$, $R^{B5}$ and $R^{B6}$, or $R^{B7}$ and $R^{B8}$ may be bonded to each other to form a ring, $R^{B9}$ to $R^{B12}$ each independently represent a hydrogen atom or an alkyl group, m1 to m4 each independently represent an integer of from 0 to 5, and $Z^1$ to $Z^4$ each independently represent a single bond or a carbon atom, and when $Z^1$ to $Z^4$ each represent a single bond, $R^{B1}$ to $R^{B8}$ are excluded from the formula (II-1).

<7> The polycarbonate resin composition according to any one of Items <1> to <6>, wherein the phosphorus-based compound (B) comprises bis(2,4-dicumylphenyl)-pentaerythritol diphosphite.

<8> The polycarbonate resin composition according to any one of Items <1> to <7>, wherein the polyether compound (C) has a polyoxyalkylene structure represented by $(R^{C1}O)_m$ and a polyoxyalkylene structure represented by $(R^{C2}O)_n$, wherein $R^{C1}$ and $R^{C2}$ each independently represent an alkylene group having 1 or more carbon atoms, m+n is 5 or more and less than 300, in m $R^{C1}O$ groups, a plurality of $R^{C1}$'s may be identical to each other, or may represent alkylene groups different from each other in number of carbon atoms, and in n $R^{C2}O$ groups, a plurality of $R^{C2}$'s may be identical to each other, or may represent alkylene groups different from each other in number of carbon atoms.

<9> The polycarbonate resin composition according to any one of Items <1> to <8>, wherein the polyether compound (C) comprises at least one selected from the group consisting of a compound (C-1) represented by the following formula (III), an alkylene oxide adduct of a polyhydric alcohol and an ester thereof (C-2), and a cyclic polyether compound (C-3):

$$R^{C3}O\text{—}(R^{C1}O)_m\text{-A-}(R^{C2}O)_n\text{—}R^{C4} \quad (III)$$

wherein $R^{C1}$ and $R^{C2}$ each independently represent an alkylene group having 1 or more carbon atoms, m+n is 5 or more and less than 300, in m $R^{C1}O$ groups, a plurality of $R^{C1}$'s may be identical to each other, or may represent alkylene groups different from each other in number of carbon atoms, and in n $R^{C2}O$ groups, a plurality of $R^{C2}$'s may be identical to each other, or may represent alkylene groups different from each other in number of carbon atoms, $R^{C3}$ and $R^{C4}$ each independently represent a hydrogen atom, a hydrocarbon group having 1 to 30 carbon atoms, an alkanoyl group having 1 to 30 carbon atoms, an alkenoyl group having 2 to 30 carbon atoms, or a glycidyl group, and A represents a single bond or a divalent organic group.

<10> An optical molded article, which is obtained by molding the polycarbonate resin composition of any one of Items <1> to <9>.

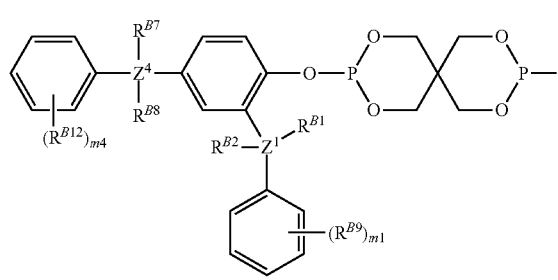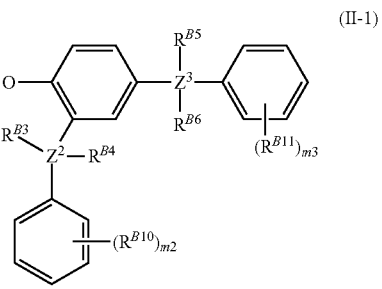

<11> The optical molded article according to Item <10>, wherein the optical molded article comprises a light-guiding plate.

Advantageous Effects of Invention

According to the embodiments of the present invention, the polycarbonate resin composition that is not reduced in optical characteristics by its deterioration at the time of its molding even when molded in a wide temperature region, and the optical molded article using the composition can be provided.

DESCRIPTION OF EMBODIMENTS

A polycarbonate resin composition of the present invention includes, with respect to 100 parts by mass of an aromatic polycarbonate resin (A), 0.005 part by mass to 1 part by mass of a specific phosphorus-based compound (B), and 0.005 part by mass to 5 parts by mass of a polyether compound (C) having a polyoxyalkylene structure.

The inventors of the present invention have found that combined use of the specific phosphorus-based compound (B) excellent in hydrolysis resistance and the polyether compound (C) can provide a polycarbonate resin composition that is not reduced in optical characteristics by its deterioration at the time of its molding even when molded in a wide temperature region. Although the working mechanism of the foregoing has not been elucidated yet, the mechanism is assumed to be as described below. When the specific phosphorus-based compound (B) and the polyether compound (C) are used in combination, the phosphorus-based compound (B) and the polyether compound (C) uniformly disperse, or form a special structure, in the resin composition, and hence the efficiency and function of the compound (B) as an antioxidant are improved. As a result, even when the composition is molded at a high temperature of more than 360° C., the production of a pyrolysate is reduced and hence reductions in optical characteristics of a molded body do not occur. Meanwhile, even when the composition is molded at less than 300° C., the flowability of the composition is satisfactory and hence the reductions in optical characteristics of the molded body do not occur.

[Component (A): Aromatic Polycarbonate Resin (A)]

A resin produced by a known method can be used as the aromatic polycarbonate resin (A) to be incorporated into the polycarbonate resin composition of the present invention without any particular limitation.

For example, a resin produced from a dihydric phenol and a carbonate precursor by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like can be used.

Examples of the dihydric phenol can include various dihydric phenols, in particular, 2,2-bis(4-hydroxyphenyl) propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, examples thereof can also include hydroquinone, resorcin, and catechol. One kind of those dihydric phenols may be used alone, or two or more kinds thereof may be used in combination. Among them, bis(hydroxyphenyl)alkane-based phenols are preferred, and bisphenol A is particularly suitable.

The carbonate precursor is, for example, a carbonyl halide, a carbonyl ester, or a haloformate, and is specifically phosgene, a dihaloformate of a dihydric phenol, diphenyl carbonate, dimethyl carbonate, diethyl carbonate, or the like.

It should be noted that the component (A) in the present invention may have a branched structure, and a branching agent may be, for example, 1,1,1-tris(4-hydroxyphenyl)-ethane, α,α',α"-tris(4-hydroxyphenyl)-1,3,5-triisopropylbenzene, phloroglucin, trimellitic acid, or 1,3-bis(o-cresol).

A monovalent carboxylic acid or a derivative thereof or a monohydric phenol can be used as the end terminator. Examples thereof can include p-tert-butyl-phenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)-perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

It is preferred that the aromatic polycarbonate resin (A) includes a polycarbonate including, in a main chain thereof, a repeating unit represented by the following formula (I):

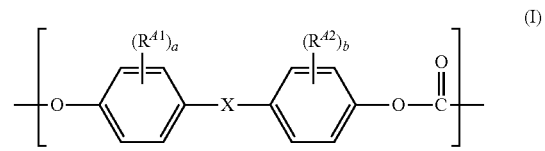

wherein $R^{41}$ and $R^{42}$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of from 0 to 4.

Examples of the alkyl group represented by each of $R^{41}$ and $R^{42}$ include a methyl group, an ethyl group, a n-propyl group, an isopropyl group, various butyl groups (the term "various" means that a linear group and various branched groups are included, and the same holds true for the following), various pentyl groups, and various hexyl groups.

An example of the alkoxy group represented by each of $R^{41}$ and $R^{42}$ is an alkoxy group whose alkyl group moiety is the alkyl group described above.

$R^{41}$ and $R^{42}$ each preferably represent an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

a and b each independently represent an integer of from 0 to 4, preferably from 0 to 2, more preferably 0 or 1.

In the present invention, the aromatic polycarbonate resin (A) preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the formula (I) represents an isopropylidene group. The content of the polycarbonate resin having a bisphenol A structure in the aromatic polycarbonate resin (A) is preferably from 50 mass % to 100 mass %, more preferably from 75 mass % to 100 mass %, still more preferably from 85 mass % to 100 mass %.

In the present invention, the viscosity-average molecular weight (Mv) of the component (A) is preferably from 9,000 to 50,000, more preferably from 10,000 to 30,000, still more preferably from 11,000 to 25,000 from the viewpoint of the flowability.

In the present invention, the viscosity-average molecular weight (Mv) is calculated from the following equation by using a limiting viscosity [η] determined through the measurement of the viscosity of a methylene chloride solution at 20° C. with an Ubbelohde-type viscometer.

$$[\eta]=1.23\times 10^{-5} \text{Mv}^{0.83}$$

[Component (B): Phosphorus-Based Compound (B) Having Aryl Group]

The phosphorus-based compound (B) to be incorporated into the polycarbonate resin composition of the present invention is such a compound that the amount of a compound having a phenol structure produced by the decomposition of the compound 1,500 hours after its standing under the conditions of 40° C. and a humidity of 90% is 5 mass % or less, preferably 3 mass % or less, more preferably 1 mass % or less, particularly preferably 0.5 mass % or less with respect to the phosphorus-based compound (B). That is, the phosphorus-based compound (B) to be used in the present invention is excellent in hydrolysis resistance and produces a small amount of the compound having a phenol structure. It should be noted that the amount of the compound having a phenol structure can be determined with a gas chromatograph, and more specifically, is measured by a method to be described in Examples.

In general, a phosphite-based antioxidant having a pentaerythritol diphosphite structure has high heat resistance, and hence exhibits a sufficient antioxidant action without gasifying even in molding at a high temperature of more than 340° C. However, many of the phosphite-based antioxidants are liable to hydrolyze, and in the moist heat resistance test of a light-guiding plate, an antioxidant in the light-guiding plate is liable to hydrolyze to cause the following problem: the light-guiding plate discolors or becomes opaque owing to an influence of the hydrolysate. In WO 2013/088796 A1, there is a disclosure that a specific diphosphite-based antioxidant typified by bis(2,4-dicumylphenyl)pentaerythritol diphosphite is effective as an antioxidant capable of satisfying both required characteristics, i.e., heat resistance and hydrolysis resistance.

However, the method of WO 2013/088796 A1 requires an alicyclic epoxy compound from the viewpoint of the moist heat resistance of the light-guiding plate. In addition, in the method, sufficient performance cannot be expressed in the molding temperature region of less than 300° C., though excellent heat stability in high-temperature molding is obtained.

The inventors of the present invention have found that the use of the specific phosphorus-based compound (B) in combination with the polyether compound (C) can provide a polycarbonate resin composition that is not reduced in optical characteristics by its deterioration at the time of its molding even when molded in a wide temperature region.

The phosphorus-based compound (B) to be used in the present invention is preferably a phosphorus-based compound having a phosphite structure, more preferably a pentaerythritol diphosphite compound represented by the following formula (II):

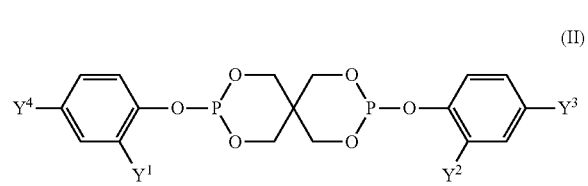

wherein $Y^1$ to $Y^4$ each independently represent a hydrocarbon group having 6 or more carbon atoms, preferably a substituted or unsubstituted cumyl group, a substituted or unsubstituted phenyl group, a substituted or unsubstituted naphthyl group, or a substituted or unsubstituted biphenyl group.

The phosphorus-based compound (B) to be used in the present invention is more preferably a pentaerythritol diphosphite compound represented by the following formula (II-1):

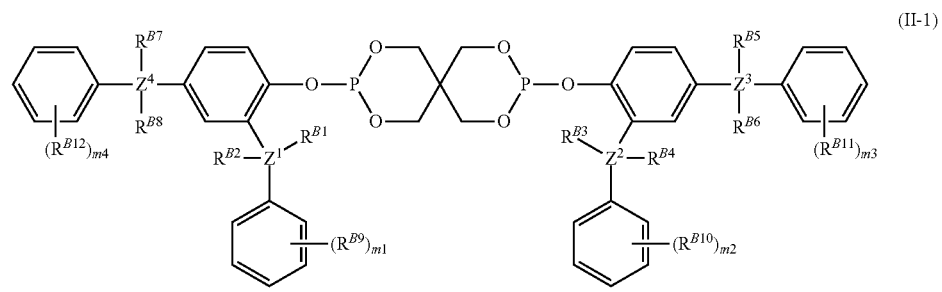

wherein $R^{B1}$ to $R^{B8}$ each independently represent an alkyl group or an alkenyl group, $R^B$ and $R^{B2}$, $R^{B3}$ and $R^{B4}$, $R^{B5}$ and $R^{B6}$, or $R^{B7}$ and $R^{B8}$ may be bonded to each other to form a ring, $R^{B9}$ to $R^{B12}$ each independently represent a hydrogen atom or an alkyl group, m1 to m4 each independently represent an integer of from 0 to 5, and $Z^1$ to $Z^4$ each independently represent a single bond or a carbon atom, and when $Z^1$ to $Z^4$ each represent a single bond, $R^{B1}$ to $R^{B8}$ are excluded from the formula (II-1).

The pentaerythritol diphosphite compound represented by the formula (II) or (II-1) can be obtained by adding a chlorine-based solvent to phosphorus trichloride and pentaerythritol to provide pentaerythritol dichlorophosphite, and then heating and mixing the contents in the presence of an aromatic solvent and an organic nitrogen-containing basic compound (see, for example, JP 2004-018406 A).

Among the pentaerythritol diphosphite compounds each represented by the formula (II) or (II-1), bis(2,4-dicumylphenyl)pentaerythritol diphosphite represented by the following formula (II-2) is particularly suitable because the compound can satisfactorily impart heat resistance and hydrolysis resistance to the polycarbonate resin composition, and is easily available. The compound is available as a commercial product, and for example, "Doverphos (trademark) S-9228PC" manufactured by Dover Chemical Corporation can be used.

In m $R^{C1}O$ groups, a plurality of $R^{C1}$'s may represent alkylene groups identical to each other, or may represent alkylene groups different from each other in number of carbon atoms. That is, a polyoxyalkylene group represented by $(R^{C1}O)_m$ is not limited to a group having a single oxyalkylene unit as a repeating unit, such as a polyoxyethylene group or a polyoxypropylene group, and may be a group having a plurality of oxyalkylene units different from each other in number of carbon atoms, such as an oxyethylene unit and an oxypropylene unit, as repeating units.

In addition, the same description as that of $R^{C1}$ holds true for $R^{C2}$, and in n $R^{C2}O$ groups, a plurality of $R^{C2}$'s may represent alkylene groups identical to each other, or may represent alkylene groups different from each other in number of carbon atoms.

In addition, the polyether compound (C) is preferably at least one selected from the group consisting of a compound (C-1) represented by the following formula (III), an alkylene oxide adduct of a polyhydric alcohol and an ester thereof (C-2), and a cyclic polyether compound (C-3):

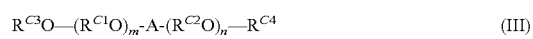

$$R^{C3}O-(R^{C1}O)_m\text{-A-}(R^{C2}O)_n-R^{C4} \quad (III)$$

wherein $R^{C1}$ and $R^{C2}$ each independently represent an alkylene group having 1 or more carbon atoms, m+n is 5 or more and less than 300, $R^{C3}$ and $R^{C4}$ each independently represent a hydrogen atom, a hydrocarbon group having 1 to 30

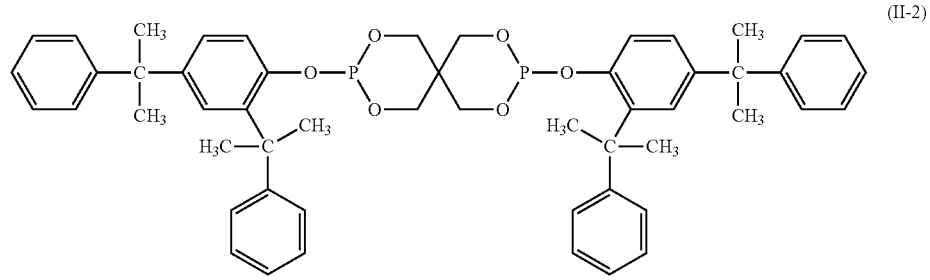 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

The content of the phosphorus-based compound (B) in the aromatic polycarbonate resin of the present invention is from 0.005 part by mass to 1 part by mass, preferably from 0.01 part by mass to 0.8 part by mass, more preferably from 0.03 part by mass to 0.5 part by mass with respect to 100 parts by mass of the aromatic polycarbonate resin (A) from the viewpoint that a polycarbonate resin composition that is not reduced in optical characteristics by its deterioration at the time of its molding even when molded in a wide temperature region is obtained.

[Component (C): Polyether Compound (C) Having Polyoxyalkylene Structure]

The polyether compound (C) having a polyoxyalkylene structure to be incorporated into the polycarbonate resin composition of the present invention preferably has a polyoxyalkylene structure represented by $(R^{C1}O)_m$ and a polyoxyalkylene structure represented by $(R^{C2}O)_n$. In the formulae, $R^{C1}$ and $R^{C2}$ each independently represent an alkylene group having 1 or more carbon atoms. m+n is 5 or more and less than 300, preferably from 10 to 200, more preferably from 20 to 100.

Examples of the alkylene group represented by each of $R^{C1}$ and $R^{C2}$ include a methylene group, an ethylene group, a trimethylene group, a propylene group, a tetramethylene group, and a hexamethylene group. Among them, an alkylene group having 1 to 5 carbon atoms is preferred.

carbon atoms, an alkanoyl group having 1 to 30 carbon atoms, an alkenoyl group having 2 to 30 carbon atoms, or a glycidyl group, and A represents a single bond or a divalent organic group.

The alkylene group represented by each of $R^{C1}$ and $R^{C2}$ is as described above. The polyoxyalkylene structure represented by $(R^{C1}O)_m$ and the polyoxyalkylene structure represented by $(R^{C2}O)_n$ are also as described above.

Examples of the hydrocarbon group having 1 to 30 carbon atoms represented by each of $R^{C3}$ and $R^{C4}$ include an alkyl group having 1 to 30 carbon atoms, an alkenyl group having 2 to 30 carbon atoms, an aryl group having 6 to 30 carbon atoms, and an aralkyl group having 7 to 30 carbon atoms.

Each of the alkyl group and the alkenyl group may be linear, branched, or cyclic. Examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group. Examples of the aryl group include a phenyl group, a tolyl group, and a xylyl group. Examples of the aralkyl group include a benzyl group, a phenethyl group, and a methylbenzyl group.

The alkanoyl group having 1 to 30 carbon atoms represented by each of $R^{C3}$ and $R^{C4}$ may be linear or branched, and examples thereof include a methanoyl group, an ethanoyl group, a n-propanoyl group, an isopropanoyl group, a n-butanoyl group, a t-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of the compatibility, heat stability, and ease of production of the composition.

The alkenoyl group having 2 to 30 carbon atoms represented by each of $R^{C3}$ and $R^{C4}$ may be linear or branched, and examples thereof include an ethenoyl group, a n-propenoyl group, an isopropenoyl group, a n-butenoyl group, a t-butenoyl group, a n-hexenoyl group, a n-octenoyl group, a n-decenoyl group, and a n-dodecenoyl group. Among them, an alkenoyl group having 2 to 10 carbon atoms is preferred, and an alkenoyl group having 2 to 6 carbon atoms is more preferred from the viewpoint that the molecular weight of the composition is reduced, from the viewpoints of its compatibility and solubility, and from the viewpoint of its ease of production.

The divalent organic group represented by A is, for example, a group represented by the following formula (a).

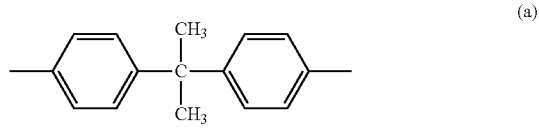

(a)

Specific examples of the compound (C-1) represented by the formula (III) include polyethylene glycol, polypropylene glycol, polytetramethylene glycol, polyoxytetramethylene-polyoxyethylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate. Those compounds are available as commercial products, and for example, "UNIOX (trademark)", "UNIOL (trademark)", "UNILUB (trademark)", "UNISAFE (trademark)", "POLYCERIN (trademark)", or "EPIOL (trademark)", which is manufactured by NOF Corporation, can be used.

In the alkylene oxide adduct of a polyhydric alcohol and the ester thereof (C-2), examples of the polyhydric alcohol include glycerin, diglyceryl ether, and sorbitol.

Specific examples of the cyclic polyether compound (C-3) include 18-crown-6 and dibenzo-18-crown-6.

In, for example, JP 4069364 B2, as related art, there is a disclosure that the addition of a polyoxyalkylene glycol improves the light transmittance of a polycarbonate resin. A polyoxyalkylene glycol formed of an alkyl group having 1 to 3 carbon atoms, or a derivative formed of the glycol and a specific aliphatic compound is used as the polyoxyalkylene glycol to be used in the technical contents. A polyoxyethylene glycol or a polyoxypropylene glycol is a hydrophilic polymer and has high compatibility with a polycarbonate resin because any such glycol is a polyoxyalkylene glycol of an alkyl group having a small number of carbon atoms. On the other hand, however; any such glycol has low heat resistance and hence involves the following drawbacks: when a polycarbonate resin having added thereto the glycol is molded at a temperature of more than 320° C., its hue reduces to reduce its luminance and light transmittance; and when the resin is molded at a temperature of more than 340° C., the resin cannot be used as a light-guiding material owing to the occurrence of silver by its decomposition gas.

The inventors of the present invention have found that the use of the polyether compound (C) in combination with the specific phosphorus-based compound (B) can provide a polycarbonate resin composition that is not reduced in optical characteristics by its deterioration at the time of its molding even when molded in a wide temperature region.

The number-average molecular weight of the polyether compound (C), which is not particularly limited, is preferably from 200 to 10,000, more preferably from 500 to 8,000, still more preferably from 1,000 to 5,000.

The content of the polyether compound (C) in the aromatic polycarbonate resin of the present invention is from 0.005 part by mass to 5 parts by mass, preferably from 0.05 part by mass to 2 parts by mass, more preferably from 0.1 part by mass to 1 part by mass with respect to 100 parts by mass of the aromatic polycarbonate resin (A) from the viewpoint that a polycarbonate resin composition that is not reduced in optical characteristics by its deterioration at the time of its molding even when molded in a wide temperature region is obtained.

[Additive]

In addition to the components (A) to (C), a polyorganosiloxane or the like can be appropriately added to the polycarbonate resin composition of the present invention.

The polyorganosiloxane is preferably a compound having one or more kinds of functional groups such as an alkoxy group, an aryloxy group, a polyoxyalkylene group, a carboxyl group, a silanol group, an amino group, a mercapto group, an epoxy group, and a vinyl group.

The addition amount of the polyorganosiloxane is preferably from 0.01 part by mass to 0.15 part by mass, more preferably from 0.02 part by mass to 0.15 part by mass, still more preferably from 0.05 part by mass to 0.1 part by mass with respect to 100 parts by mass of the aromatic polycarbonate resin (A). When the addition amount falls within the range, the polyorganosiloxane can concert with any other component to improve the releasability of the composition. Further, even under a molding condition at a high temperature of more than 340° C., in particular, a continuous molding condition, the occurrence of silver and the amount of a mold deposit can be significantly reduced.

The viscosity of the polyorganosiloxane at 25° C. is preferably 10 mm is or more from the viewpoint of a lubricating effect serving as the releasability, and is preferably 200 mm/s or less from the viewpoint of its dispersibility in the polycarbonate resin. From the viewpoints, the viscosity of the polyorganosiloxane falls within the range of more preferably from 20 mm²/s to 150 mm²/s, still more preferably from 40 mm²/s to 120 mm²/s.

A difference between the refractive index of the polyorganosiloxane and the refractive index of a polycarbonate is preferably made as small as possible in order that the transparency of the polycarbonate may not be reduced upon addition of the polyorganosiloxane thereto. The refractive index of the polyorganosiloxane is preferably 1.45 or more, more preferably 1.50 or more, still more preferably 1.52 or more because the refractive index of the polycarbonate is 1.58.

[Aromatic Polycarbonate Resin Composition and Optical Molded Article]

A method of producing the polycarbonate resin composition of the present invention is not particularly limited.

For example, the components (A) to (C), and as required, the additive are mixed, and the mixture is melted and kneaded. The melting and kneading can be performed by a typically used method, for example, a method using a ribbon blender, a Henschel mixer, a Banbury mixer, a drum tumbler, a single-screw extruder, a double-screw extruder, a co-kneader, a multiple-screw extruder, or the like. In normal cases, a heating temperature at the time of the melting and kneading is appropriately selected from the range of from about 220° C. to about 300° C.

The polycarbonate resin composition of the present invention can be produced by using the melt-kneaded product or the resultant resin pellet as a raw material through the application of a known molding method, such as a hollow molding method, an injection molding method, an injection compression molding method, an extrusion molding method, a vacuum molding method, a blow molding method, a press molding method, an air-pressure molding method, an expansion molding method, a heat bending molding method, a compression molding method, a calender molding method, or a rotational molding method.

The polycarbonate resin composition of the present invention is suitable for a molding method requiring a molding material to have high flowability, such as the injection molding method, because the composition is improved in heat resistance that has heretofore been insufficient and hence can resist molding at a high temperature of more than 340° C. Meanwhile, in the extrusion molding method, a product having high optical characteristics, such as a sheet or a film, the product having high transparency and being free from yellowing, can be obtained by molding the composition at a low temperature of from about 220° C. to about 280° C.

The polycarbonate resin composition of the present invention is a resin composition excellent in light transmittance and luminance, and capable of resisting molding at high temperature, and is particularly suitable for injection molding. Meanwhile, the composition has high low-temperature molding suitability. Accordingly, the composition can provide a molded article excellent in light transmission property in molding except the injection molding as well, and is hence useful as an optical molded article, in particular, a light-guiding plate.

The light-guiding plate is not particularly limited and may be a flat plate having a thickness of from several millimeters to several hundreds of micrometers, or may be a curved plate or prism transfer plate having a lens effect. A molding method therefor is also not particularly limited, and the shape of, and the molding method for, the plate need only to be appropriately selected in accordance with purposes and applications.

EXAMPLES

The present invention is described more specifically by way of Examples below but the present invention is not limited to these Examples.

[Measurement of Viscosity-Average Molecular Weight (Mv)]

A viscosity-average molecular weight was calculated from the following equation after the determination of a limiting viscosity [η] through the measurement of the viscosity of a methylene chloride solution at 20° C. with an Ubbelohde-type viscometer.

$$[\eta]=1.23\times10^{-5} Mv^{0.83}$$

[Hydrolysis Resistance Test of Phosphorus-Based Compound]

A phosphorus-based compound was left to stand under the conditions of 40° C. and a humidity of 90% for 1,500 hours. After that, the mass of a compound having a phenol structure produced by its decomposition was determined with a gas chromatograph apparatus "GC-2014" manufactured by Shimadzu Corporation, and the ratio of the compound to the phosphorus-based compound was measured.

Components used in Examples and Comparative Examples are as described below.

<Aromatic Polycarbonate Resin (A)>
(A1): "TARFLON FN1500" (manufactured by Idemitsu Kosan Co., Ltd., bisphenol A polycarbonate resin, viscosity-average molecular weight (Mv)=14,500)
(A2): "TARFLON FN1200" (manufactured by Idemitsu Kosan Co., Ltd., bisphenol A polycarbonate resin, viscosity-average molecular weight (Mv)=11,500)

<Phosphorus-Based Compound (B)>
(B1): "Doverphos S-9228PC" (manufactured by Dover Chemical Corporation, bis(2,4-dicumylphenyl)pentaerythritol diphosphite, produced 0.15 mass % of dicumylphenol after the hydrolysis resistance test)
(B2): "ADK STAB 2112" (manufactured by ADEKA Corporation, tris(2,4-di-tert-butylphenyl) phosphite, produced 6 mass % of 2,4-di-tert-butylphenol after the hydrolysis resistance test)
(B3): "ADK STAB PEP-36" (manufactured by ADEKA Corporation, bis(2,6-di-tert-butyl-4-methylphenyl)pentaerythritol diphosphite, produced 45 mass % of 2,6-di-tert-butyl-4-methylphenol after the hydrolysis resistance test)

<Polyether Compound (C)>
(C1): "POLYCERIN DC-1100" (manufactured by NOF Corporation, polyoxytetramethylene glycol-polyoxyethylene glycol)
(C2): "POLYCERIN DC-3000E" (manufactured by NOF Corporation, polyoxytetramethylene glycol-polyoxyethylene glycol)
(C3): "UNIOX GT-20IS" (manufactured by NOF Corporation, polyoxyethylene-triisostearic acid)
(C4): "UNILUB 50DB-22" (manufactured by NOF Corporation, polyoxyethylene-polyoxypropylene-bisphenol A ether)
(C5): "EPIOLE-1000" (manufactured by NOF Corporation, polyethylene glycol diglycidyl ether)
(C6): "UNISAFE NKL-9520" (manufactured by NOF Corporation, polypropylene glycol distearate)
(C7): "PEG-6000J" (manufactured by Lion Corporation, polyethylene glycol)
(C8): 18-crown-6 (manufactured by Wako Pure Chemical Industries, Ltd.)

<Other Additive>
"KR-511" (manufactured by Shin-Etsu Chemical Co., Ltd., polyorganosiloxane compound)
"CELLOXIDE 2021P" (manufactured by Daicel Corporation, 3,4-epoxycyclohexylmethyl-3',4'-epoxycyclohexanecarboxylate)

Examples 1 to 9 and Comparative Examples 1 to 4

The foregoing components were melted and kneaded with a vented single screw extruder having a screw diameter of 40 mm ("VS-40" manufactured by Tanabe Plastics Machinery Co., Ltd.) at a cylinder temperature of 250° C., and the melt-kneaded product was subjected to strand cutting to provide a pellet. The resultant pellet was dried at 110° C. for 5 hours, and was then molded into a flat plate-like test piece having a thickness of 5 mm with an injection molding machine ("ES 1000" manufactured by Nissei Plastic Industrial Co., Ltd.) at a preset cylinder temperature of 280° C. or 360° C. for a cycle time of 50 seconds.

The YI value of the test piece obtained in the foregoing was measured with a spectrophotometer ("U-4100" manufactured by Hitachi High-Technologies Corporation) under the conditions of a C light source and a two-degree field of view. The result is shown in Table 1. It should be noted that acceptance criteria are as follows: the YI of the test piece molded at 280° C. (280° C. molding YI) is 1.15 or less, and the YI of the test piece molded at 360° C. (360° C. molding YI) is 1.15 or less.

TABLE 1

| | | | Amount of phenolic compound after hydrolysis resistance test | Example | | | | | | |
|---|---|---|---|---|---|---|---|---|---|---|
| | | | | 1 | 2 | 3 | 4 | 5 | 6 | 7 |
| Resin composition (parts(s) by mass) | Aromatic polycarbonate resin (A) | (A1) FN1500 | | 100 | — | 100 | 100 | 100 | 100 | 100 |
| | | (A2) FN1200 | | — | 100 | — | — | — | — | — |
| | Phosphorus-based compound (B) | (B1) Doverphos S-9228PC | 0.15 mass % | 0.05 | 0.05 | 0.05 | 0.05 | 0.05 | 0.05 | 0.05 |
| | | (B2) ADK STAB 2112 | 6 mass % | — | — | — | — | — | — | — |
| | | (B3) ADK STAB PEP-36 | 45 mass % | — | — | — | — | — | — | — |
| | Polyether compound (C) | (C1) POLYCERIN DC-1100 | | 0.2 | — | — | — | — | — | — |
| | | (C2) POLYCERIN DC-3000E | | — | 0.2 | 0.5 | — | — | — | — |
| | | (C3) UNIOX GT-20IS | | — | — | — | 0.2 | — | — | — |
| | | (C4) UNILUB 50DB-22 | | — | — | — | — | 0.2 | — | — |
| | | (C5) EPIOL E-1000 | | — | — | — | — | — | 0.2 | — |
| | | (C6) UNISAFE NKL-9520 | | — | — | — | — | — | — | 0.5 |
| | | (C7) PEG6000J | | — | — | — | — | — | — | — |
| | | (C8) 18-Crown-6 | | — | — | — | — | — | — | — |
| | Other additive | KR-511 | | — | — | — | — | — | — | — |
| | | CELLOXIDE 2021P | | — | — | — | — | — | — | — |
| Evaluation | | 280° C. molding YI | | 1.00 | 1.00 | 0.96 | 1.08 | 1.11 | 1.02 | 1.08 |
| | | 360° C. molding YI | | 1.01 | 1.05 | 1.06 | 1.11 | 1.13 | 1.08 | 1.11 |

| | | | Amount of phenolic compound after hydrolysis resistance test | Example | | Comparative Example | | | |
|---|---|---|---|---|---|---|---|---|---|
| | | | | 8 | 9 | 1 | 2 | 3 | 4 |
| Resin composition (parts(s) by mass) | Aromatic polycarbonate resin (A) | (A1) FN1500 | | 100 | 100 | 100 | 100 | 100 | 100 |
| | | (A2) FN1200 | | — | — | — | — | — | — |
| | Phosphorus-based compound (B) | (B1) Doverphos S-9228PC | 0.15 mass % | 0.1 | 0.05 | — | 0.05 | — | — |
| | | (B2) ADK STAB 2112 | 6 mass % | — | — | — | — | 0.05 | 0.05 |
| | | (B3) ADK STAB PEP-36 | 45 mass % | — | — | 0.05 | — | — | — |
| | Polyether compound (C) | (C1) POLYCERIN DC-1100 | | — | — | 0.2 | — | — | 0.2 |
| | | (C2) POLYCERIN DC-3000E | | — | — | — | — | — | — |
| | | (C3) UNIOX GT-20IS | | — | — | — | — | — | — |
| | | (C4) UNILUB 50DB-22 | | — | — | — | — | — | — |
| | | (C5) EPIOL E-1000 | | — | — | — | — | — | — |
| | | (C6) UNISAFE NKL-9520 | | — | — | — | — | — | — |
| | | (C7) PEG6000J | | 0.5 | — | — | — | — | — |
| | | (C8) 18-Crown-6 | | — | 0.1 | — | — | — | — |

TABLE 1-continued

|  |  |  |  |  |  |  |  |  |
|---|---|---|---|---|---|---|---|---|
| Other additive | KR-511 | | 0.05 | 0.05 | — | — | — | — |
| | CELLOXIDE 2021P | | — | 0.02 | — | — | — | — |
| Evaluation | 280° C. molding YI | | 1.06 | 1.04 | 1.04 | 1.19 | 1.23 | 1.13 |
| | 360° C. molding YI | | 1.11 | 1.09 | 1.19 | 1.25 | 1.35 | 1.26 |

In each of Comparative Examples 1, 3, and 4 each using such a phosphorus-based compound that the amount of a compound having a phenol structure produced after the hydrolysis resistance test is more than 5 mass %, yellowing occurs in the molding at 360° C., and particularly in Comparative Example 3 in which the polyether compound (C) is not used, yellowing occurs at each of both 280° C. and 360° C. Also in Comparative Example 2 in which such phosphorus-based compound (B) that the amount of a compound having a phenol structure produced after the hydrolysis resistance test is 5 mass % or less is used, but the polyether compound (C) is not used in combination with the compound (B), yellowing occurs and is particularly remarkable in the molding at 360° C.

In contrast, in each of Examples 1 to 9 in each of which such phosphorus-based compound (B) that the amount of a compound having a phenol structure produced after the hydrolysis resistance test is 5 mass % or less and the polyether compound (C) are used in combination, yellowing is reduced at each of both 280° C. and 360° C., and hence the composition is found to be capable of being molded in an additionally wide temperature region without yellowing.

INDUSTRIAL APPLICABILITY

The polycarbonate resin composition of the present invention is suitable for an optical product, such as a light-guiding plate, specifically a large-screen and thin display commodity such as a smart phone or a tablet PC, because the composition is excellent in heat stability in high-temperature molding and can provide a molded article that is not reduced in optical characteristics by its deterioration at the time of its molding even when molded in a wide temperature region. Meanwhile, the composition is also useful as an optical material for low-temperature molding.

The invention claimed is:

1. A polycarbonate resin composition, comprising:
   100 parts by mass of an aromatic polycarbonate resin (A);
   0.005 part by mass to 1 part by mass of a phosphorus-based compound (B) having an aryl group; and
   0.005 part by mass to 5 parts by mass of a polyether compound (C) having a polyoxyalkylene structure, wherein
   the phosphorus-based compound (B) comprises such a compound that an amount of a compound having a phenol structure produced by decomposition of the compound 1,500 hours after standing thereof under conditions of 40° C. and a humidity of 90% is 5 mass % or less with respect to the phosphorus-based compound (B), and
   a YI of a molded article obtained by molding the polycarbonate resin composition at 360° C. is 1.15 or less.

2. The polycarbonate resin composition according to claim 1, wherein the aromatic polycarbonate resin (A) comprises a polycarbonate comprising, in a main chain thereof, a repeating unit represented by the following formula (I):

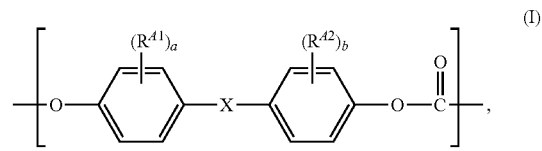

wherein:
   $R^{A1}$ and $R^{A2}$ each independently represent an alkyl group or alkoxy group having 1 to 6 carbon atoms;
   X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—; and
   a and b each independently represent an integer of from 0 to 4.

3. The polycarbonate resin composition according to claim 1, wherein the phosphorus-based compound (B) comprises a phosphorus-based compound having a phosphite structure.

4. The polycarbonate resin composition according to claim 1, wherein the phosphorus-based compound (B) comprises a pentaerythritol diphosphite compound represented by the following formula (II):

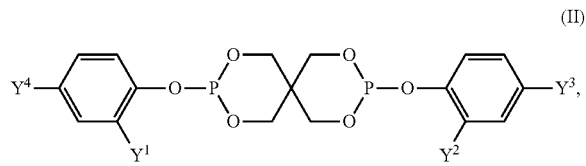

wherein $Y^1$ to $Y^4$ each independently represent a hydrocarbon group having 6 or more carbon atoms.

5. The polycarbonate resin composition according to claim 4, wherein the $Y^1$ to $Y^4$ each independently represent a substituted or unsubstituted cumyl group, a substituted or unsubstituted phenyl group, a substituted or unsubstituted naphthyl group, or a substituted or unsubstituted biphenyl group.

6. The polycarbonate resin composition according to claim 1, wherein the phosphorus-based compound (B) comprises a pentaerythritol diphosphite compound represented by the following formula (II-1):

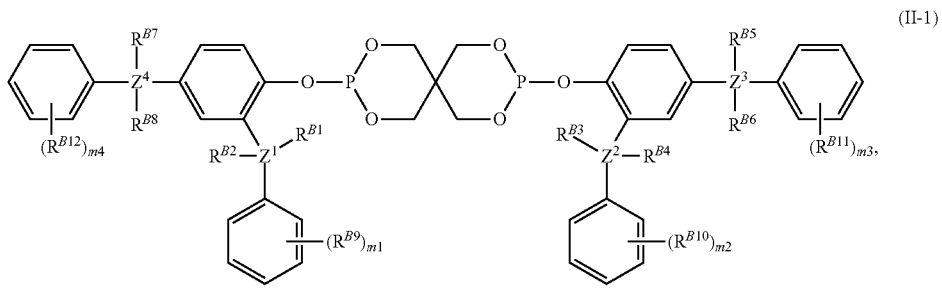

(II-1)

wherein:
$R^{B1}$ to $R^{B8}$ each independently represent an alkyl group or an alkenyl group, such that $R^{B1}$ and $R^{B2}$, $R^{B3}$ and $R^{B4}$, $R^{B5}$ and $R^{B6}$, or $R^{B7}$ and $R^{B8}$ may be bonded to each other to form a ring;
$R^{B9}$ to $R^{B12}$ each independently represent a hydrogen atom or an alkyl group;
m1 to m4 each independently represent an integer of from 0 to 5; and
$Z^1$ to $Z^4$ each independently represent a single bond or a carbon atom, such that when $Z^1$ to $Z^4$ each represent a single bond, $R^{B1}$ to $R^{B8}$ are excluded from the formula (II-1).

7. The polycarbonate resin composition according to claim 1, wherein the phosphorus-based compound (B) comprises bis(2,4-dicumylphenyl)pentaerythritol diphosphite.

8. The polycarbonate resin composition according to claim 1, wherein the polyether compound (C) has a polyoxyalkylene structure represented by $(R^{C1}O)_m$ and a polyoxyalkylene structure represented by $(R^{C2}O)_n$,
wherein:
$R^{C1}$ and $R^{C2}$ each independently represent an alkylene group having 1 or more carbon atoms;
m+n is 5 or more and less than 300;
in m $R^{C1}O$ groups, a plurality of $R^{C1}$'s may be identical to each other, or may represent alkylene groups different from each other in number of carbon atoms; and
in n $R^{C2}O$ groups, a plurality of $R^{C2}$'s may be identical to each other, or may represent alkylene groups different from each other in number of carbon atoms.

9. The polycarbonate resin composition according to claim 1, wherein the polyether compound (C) comprises at least one selected from the group consisting of a compound (C-1) represented by the following formula (III), an alkylene oxide adduct of a polyhydric alcohol and an ester thereof (C-2), and a cyclic polyether compound (C-3):

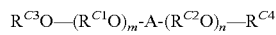

$R^{C3}O-(R^{C1}O)_m-A-(R^{C2}O)_n-R^{C4}$ (III), wherein:
$R^{C1}$ and $R^{C2}$ each independently represent an alkylene group having 1 or more carbon atoms;
m+n is 5 or more and less than 300;
in m $R^{C1}O$ groups, a plurality of $R^{C1}$'s may be identical to each other, or may represent alkylene groups different from each other in number of carbon atoms;
in n $R^{C2}O$ groups, a plurality of $R^{C2}$'s may be identical to each other, or may represent alkylene groups different from each other in number of carbon atoms;
$R^{C3}$ and $R^{C4}$ each independently represent a hydrogen atom, a hydrocarbon group having 1 to 30 carbon atoms, an alkanoyl group having 1 to 30 carbon atoms, an alkenoyl group having 2 to 30 carbon atoms, or a glycidyl group; and
A represents a single bond or a divalent organic group.

10. An optical molded article, which is obtained by molding the polycarbonate resin composition of claim 1.

11. The optical molded article according to claim 10, wherein the optical molded article comprises a light-guiding plate.

12. The polycarbonate resin composition according to claim 1, wherein a YI of a molded article obtained by molding the polycarbonate resin composition at 280° C. is 1.15 or less.

13. The polycarbonate resin composition according to claim 1, wherein the YI of a molded article obtained by molding the polycarbonate resin composition at 360° C. is 1.01 to 1.13.

14. The polycarbonate resin composition according to claim 1, wherein a YI of a molded article obtained by molding the polycarbonate resin composition at 280° C. is 0.96 to 1.11.

15. The polycarbonate resin composition according to claim 1, comprising 0.05 to 0.1 parts by mass of the phosphorus-based compound (B) having an aryl group.

16. The polycarbonate resin composition according to claim 1, comprising 0.2 to 0.5 parts by mass of the polyether compound (C) having a polyoxyalkylene structure.

* * * * *